United States Patent
Fowler, Sr. et al.

(10) Patent No.: US 6,695,219 B1
(45) Date of Patent: Feb. 24, 2004

(54) MODEL RAILROAD ROADBED INTERLOCKING SYSTEM

(76) Inventors: Harold Herbert Fowler, Sr., 1818 E. Ramble Ct., Decatur, GA (US) 30033; Wayne Lee Hackworth, 1926 Chamdun Way, Chamblee, GA (US) 30341

( * ) Notice: Subject to any disclaimer, the term of this patent is extended or adjusted under 35 U.S.C. 154(b) by 0 days.

(21) Appl. No.: 10/304,415

(22) Filed: Nov. 26, 2002

Related U.S. Application Data
(60) Provisional application No. 60/341,001, filed on Nov. 30, 2001.

(51) Int. Cl.[7] ............................................. E01B 23/00
(52) U.S. Cl. .................. 238/10 B; 238/10 E; 238/10 F; 403/381
(58) Field of Search .............................. 238/10 R, 10 A, 238/10 B, 10 C, 10 E, 10 F; 403/345, 381, 375

(56) References Cited

U.S. PATENT DOCUMENTS

| | | | | |
|---|---|---|---|---|
| 3,729,133 A | * | 4/1973 | Covert | 238/10 E |
| 4,898,326 A | * | 2/1990 | Edwards et al. | 238/10 E |
| 4,953,785 A | * | 9/1990 | Keska | 238/10 A |
| 5,085,148 A | * | 2/1992 | Konno | 104/130.09 |
| 6,385,936 B1 | * | 5/2002 | Schneider | 52/589.1 |
| 6,427,926 B1 | * | 8/2002 | Lai | 238/10 R |

* cited by examiner

Primary Examiner—Mark T. Le
(74) Attorney, Agent, or Firm—Thomas, Kayden, Horstemeyer & Risley, L.L.P.

(57) ABSTRACT

A model railroad interlocking roadbed, which is formed from sections with each section having two ends with each end having a male lock and a corresponding female lock in a side-by-side configuration. The female locks and the male locks have the same general configuration with the female lock being slightly larger. The base of both the female and the male lock is parallel to the end of the section with the sides of the locks being triangular in shape with the sides of the male lock converging inwardly to the end of the section and the ends of the female lock converging outwardly towards the end of the section.

6 Claims, 5 Drawing Sheets

MODEL RAILROAD ROADBED INTERLOCKING SYSTEM

CROSS REFERENCE TO RELATED APPLICATIONS

This application claims priority to U.S. provisional application entitled, "Model Railroad Roadbed Interlocking System," having Serial No. 60/341,001 filed Nov. 30, 2001, now abandoned, which is entirely incorporated herein by reference.

FIELD OF THE INVENTION

The present invention relates to the roadbed composed of interlocking sections for a model railroad. This roadbed is useful on which to place model railroad tracks of all gauges and sizes. The locking arrangement of this invention permits the locking of the roadbed even through curves in either direction with a uniform lock system.

DESCRIPTION OF RELATED ART

Model railroads are put together on a tabletop or floor or other solid surfaces on which is first placed a roadbed, which preferably should have the appearance of the roadbed of a full size railroad. Sections of railroad track with ties attached are then adhered to the roadbed. This roadbed may be glued or tacked to the surface to hold in proper position. The tracks are provided in sections that are attached to each other and either glued or nailed to the roadbed. As the layout of these model railroad tracks frequently has curves, the roadbed must also must be set up that it has curves as well. These curves may be of different angles and may curve to the right, left, or both in the process in the layout of a model railroad train system. One of the ways in which the roadbed can be constructed is from using a sheet of cork, which can be cut into the proper size (width and length) for putting the roadbed down in sections. The cork can then be painted or otherwise treated so that it resembles the ballast of a full size railroad. The roadbed can be constructed of sections of plastic, which can be made to look somewhat like the ballast of a full size roadbed. Other materials have been used from time to time to construct the roadbeds for model railroads.

There is a need to have a material and system for constructing the roadbed for model railroads that is easy to use and looks like the ballast of a full size railroad roadbed. There is a need that this roadbed can be constructed in sections giving the builder of the model train system the flexibility to build a railroad of the desired configuration and dimensions easily. The roadbed ballast needs to be constructed so that it can be put together in sections that are held in the proper configuration as the model railroad is being operated.

BRIEF SUMMARY OF THE INVENTION

It is an object of this invention to develop a roadbed that can be constructed in sections, which are put together and held in proper position on which the railroad tracks and ties can be placed. It is desirable that these sections can be used to securely attach sections of roadbed that either curve to the right or the left without the need for special locks for each type of curve. It is a further object that this roadbed appear similar to the ballast roadbed of a full size railroad. It is a further object that the roadbed of this invention can be held in place on a flat surface of a table or floor on which it is to be constructed. It is a further object of this invention that the sections of the railroad roadbed are interchangeable and that curves to the right and left can be constructed in any place along the railroad.

The objects of this invention are obtained by providing a roadbed that is constructed out of a fiber-based material, which simulates the color and texture of a railroad ballast of a full size railroad. This fiber material is preferably indoor/outdoor carpet of the appropriate shade of gray. This roadbed is constructed in sections of the desired length, preferable in nine (9) inch sections. These sections are held together by a unique locking system in which the end of each section has a male lock and a female lock in a side-by-side configuration. The male lock extends beyond the end of the section to a male base that is parallel to the end of this section. Two (2) sides of the lock are connected to the male base that converge towards each other towards the end of the section. One of these sides is nearer the center of the section and extends into the interior of this section and is longer than the other side.

The female lock has the same general configuration as the male lock but is slightly larger and is formed side-by-side with the male lock in the end of a section. The female lock also has two (2) sides with one side being co-extensive with the side of the male lock nearer the center. The other side of the female lock is nearer the edge of the section of the roadbed opposite the side the male lock is nearer to. The sides of the female lock diverge away from each other towards the female base in the interior of the section.

The female and male locks on the other end of the section are formed in the opposite fashion (i.e., with the male lock on one end being nearer to one edge of the section and the male lock on the other end being nearer the opposite edge of the section).

Because the male lock and the female lock are basically truncated triangles that diverge in opposite directions to each other in relation on each section of roadbed and the male lock has a side that extends into the interior of the section, a railroad roadbed can be formed that is securely interlocked. The base of the male lock and the base of the female lock are parallel to the end of the section with the male lock extending beyond the end of the section and the female lock extending into the interior of the section. It will be noted that in respect to straight sections of railroad roadbed that the end and bases of the male and female lock are perpendicular to the edges of the track. The curved sections of the track have ends and bases of the female lock and the male lock that are co-extensive to those on the straight section or another curved section at the place where two (2) sections are to be interlocked.

This track can be formed with any suitable fibrous material with the male and female locks being diecut. A suitable fibrous material is indoor/outdoor carpeting of the shade of gray. The bottom of the carpeting is frequently most useful for the top of the roadbed. An adhesive strip can be placed on the bottom of the carpet for adhering to the flat surface to which the roadbed is to be constructed.

The locking system of this invention can be used with either a straight or curved section, which may curve in either direction. The straight sections and curved sections can be interlocked together easily because all the male locks in the system are identical and female locks in the system are identical in size and configuration.

BRIEF DESCRIPTION OF THE DRAWINGS

In this brief description of the drawings.

DETAILED DESCRIPTION OF THE PREFERRED EMBODIMENT

Figure 1:
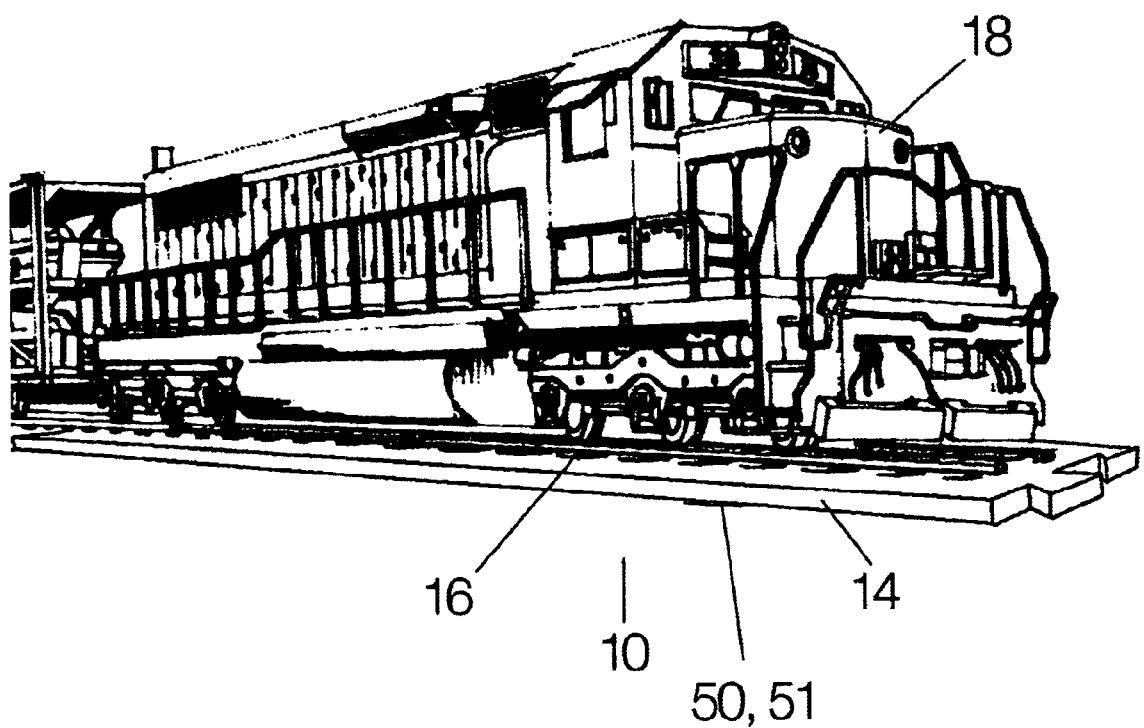
FIG. 1 is a perspective view of a section of a model railroad showing the roadbed, rails and a locomotive.

The model railroad interlocking roadbed system is designed to be placed on a flat surface such as a table or floor. A section of the roadbed with rails and a locomotive is shown in FIG. 1 illustrated by the numeral (10). The flat surface (not shown) may be a table, floor or any other surface on which a roadbed of a model railroad system can be constructed and supported. In constructing the model railroad, the roadbed (14) is first placed in place in sections. These sections may have adhesive on the bottom for gluing to the flat surface or a removable strip 50 exposing an adhesive 51 on the bottom of the roadbed may be utilized. Alternatively, the roadbed (14) could be lightly tacked to the flat surface. After the roadbed (14) has been put down, sections of track (16) may be placed on the roadbed. The interlocking roadbed of this invention is suitable with all gauges of track such as HO gauge for example. Only the width of the roadbed needs to be adjusted to accommodate track of different widths. The roadbed (14) typically comes in sections of (9) inches and the railroad track may have sections of (9) to (27) inches or more. The railroad track may be slightly tacked to the roadbed or through to the flat surface to hold in proper position. A locomotive (18) is shown on the section of track (16) and roadbed (14) in FIG. 1.

Figure 2:
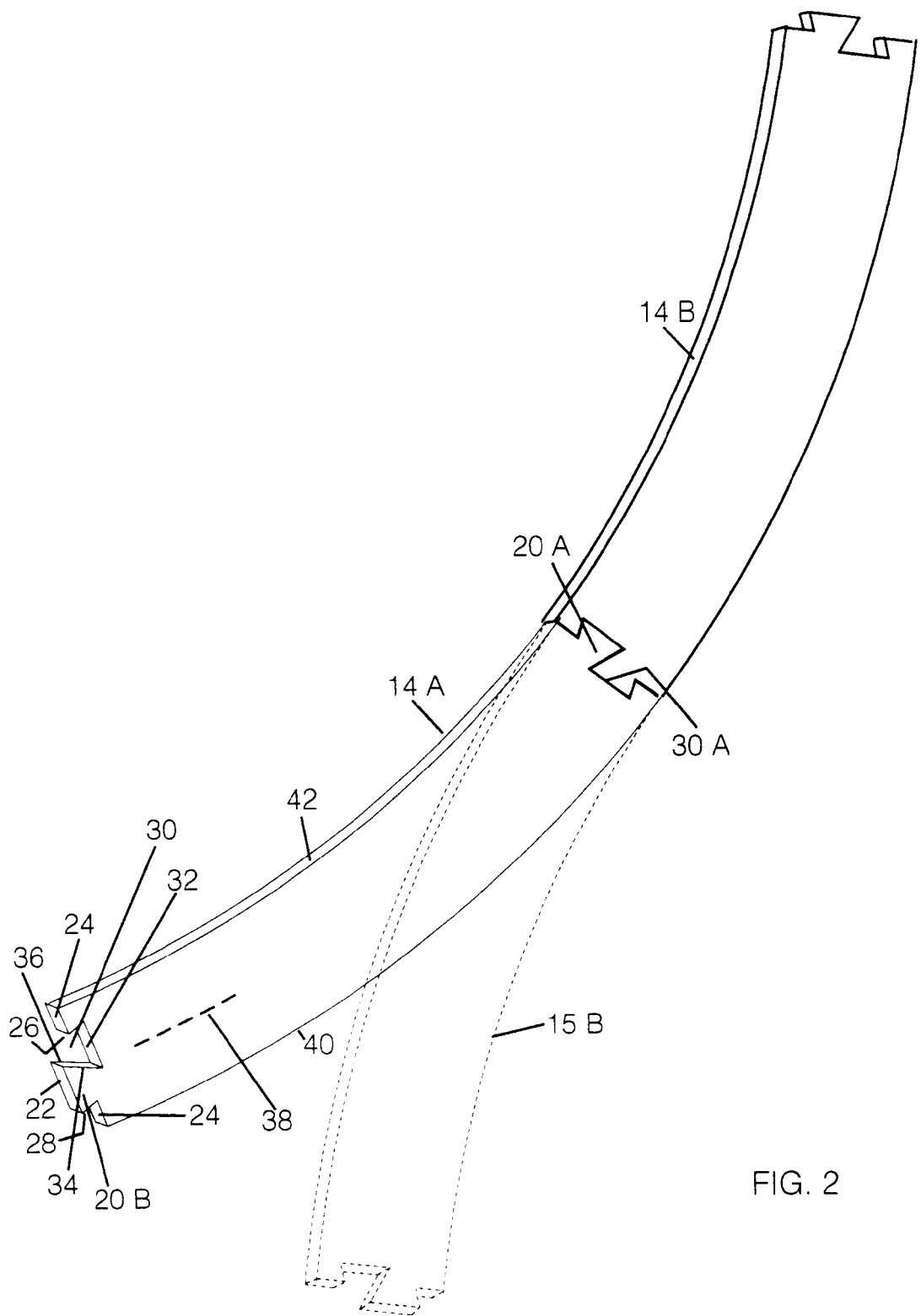
FIG. 2 is a plan view of two (2) curved sections of the railroad roadbed that are interlocked together showing the locking system.

FIG. 2 is a plan view of (2) curved sections of track 14A and 14B that are interlocked together by the locking system of this invention. The male locks 20A and 20B are formed on each end of section 14A. The male lock 20B has a male base 22 that is parallel to and extends beyond the end 24 of section 14A. This male lock 20B has two sides 26 and 28 that converge towards each other into the interior of section 14A. Female lock 30 is struck from the interior of section 14A and has a female base 32 that is parallel to the end 24 in the interior of section 14A. Female lock 30 also has two sides 34 and 36, which converge towards each other and towards the end 24 of section 14A. Side 34 of the female lock 30 also serves as side 26 of the male lock 20B. The female lock 30 and the male lock 20B are constructed side by side each other. The configuration of the female lock and the male lock is identical with the female lock being slightly larger to accommodate the male lock. The locks on all these sections are constructed in the identical fashion so that the railroad roadbed can be interlocked interchangeably.

It will be noticed that the male lock 20B has one side 26 which converges inwardly to the interior of the track 14A adjacent to center line 38 of the track. Side 28 of male lock 20B is near edge 40 of the track. The female lock 30 has a side 34 near the center line which is much longer than side 36 which is near edge 42. It will be noticed that the male lock 20A and female lock 30A are constructed in the opposite fashion with male lock 20A being nearer edge 42 than 20B.

Figure 3:
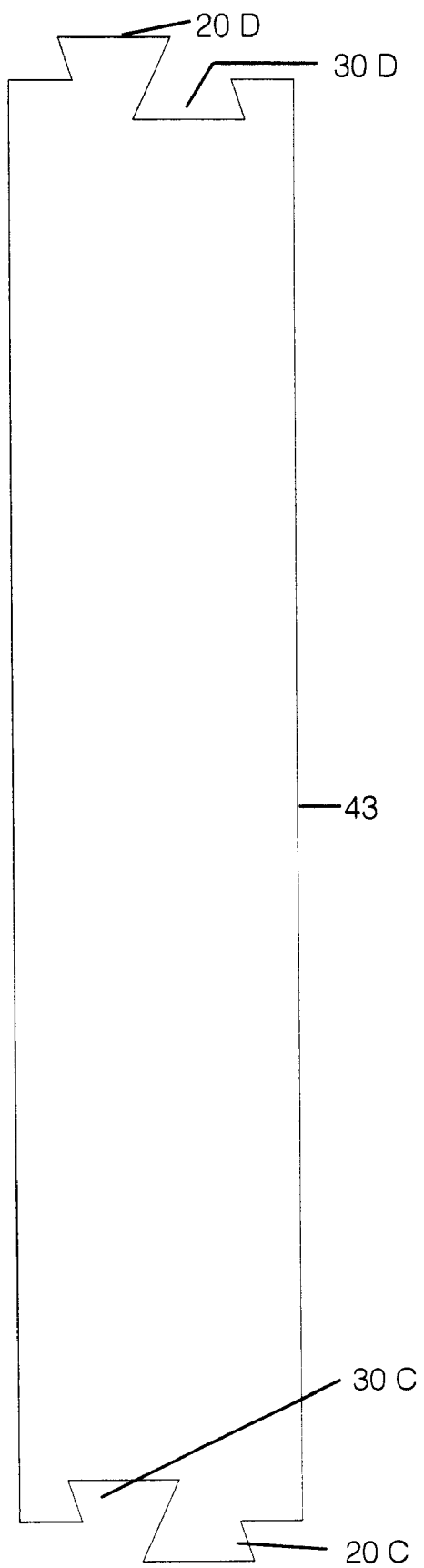
FIG. 3 shows a straight section of track.

FIG. 2 also shows how the roadbed can be constructed in sections having curved sections that curve either to the left or to the right (phantom section 15B). As shown in FIG. 3, a straight section 43, may be interlocked with another straight section in the same manner as two (2) curved sections are interlocked as shown in FIG. 2. The female 30C and 30D and male 20C and 20D locks on a straight section as shown in FIG. 3 are constructed in the same manner as the male 20A and 20B and female 30A and 30B locks in the curved section.

Figure 4:
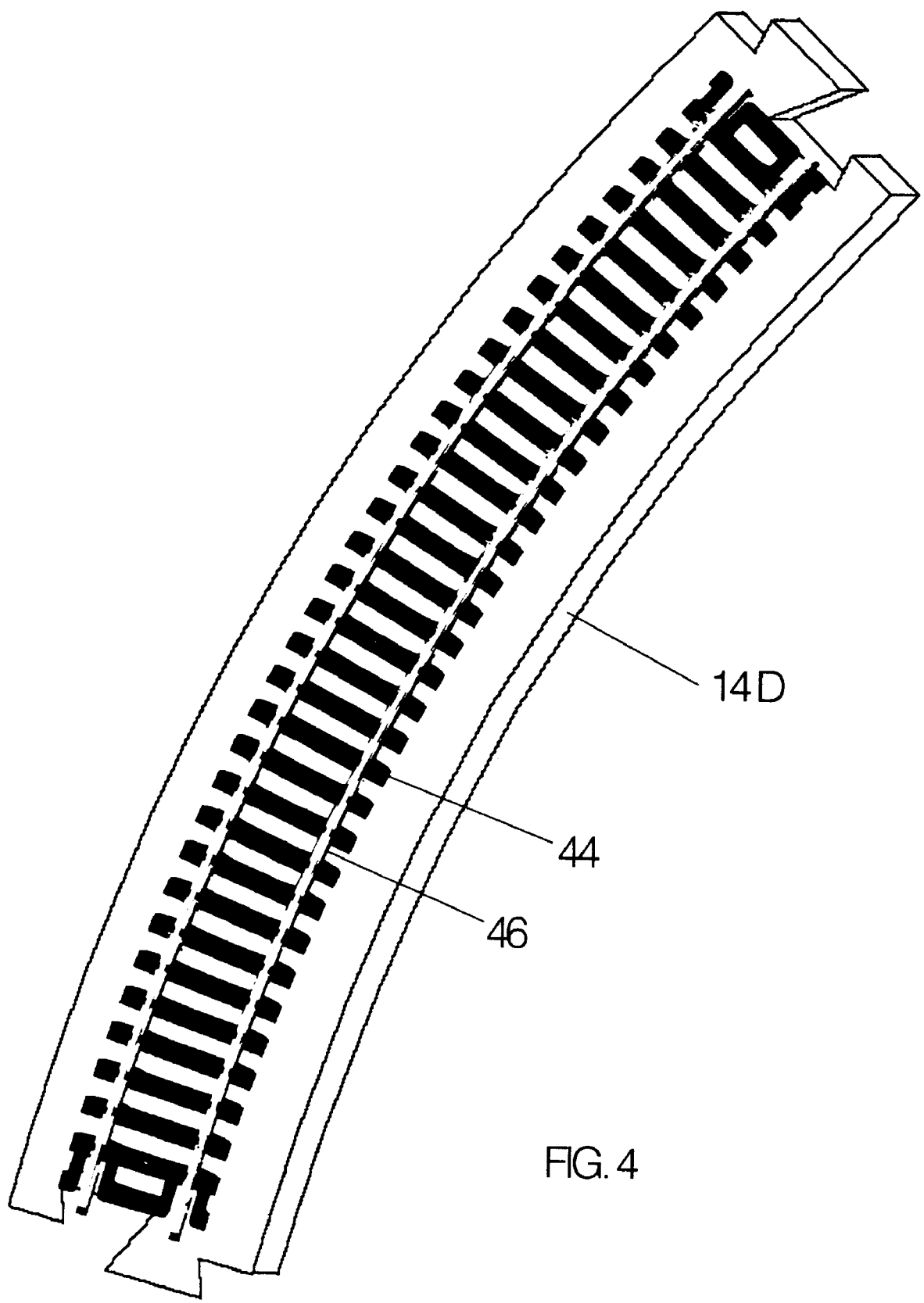
FIG. 4 is a plan view showing a curved section of a model railroad showing the roadbed, railroad ties, and rails.

FIG. 4 is a plan view of a curved section of roadbed 14D joining the railroad tie 44 and rails 46.

Figure 5:
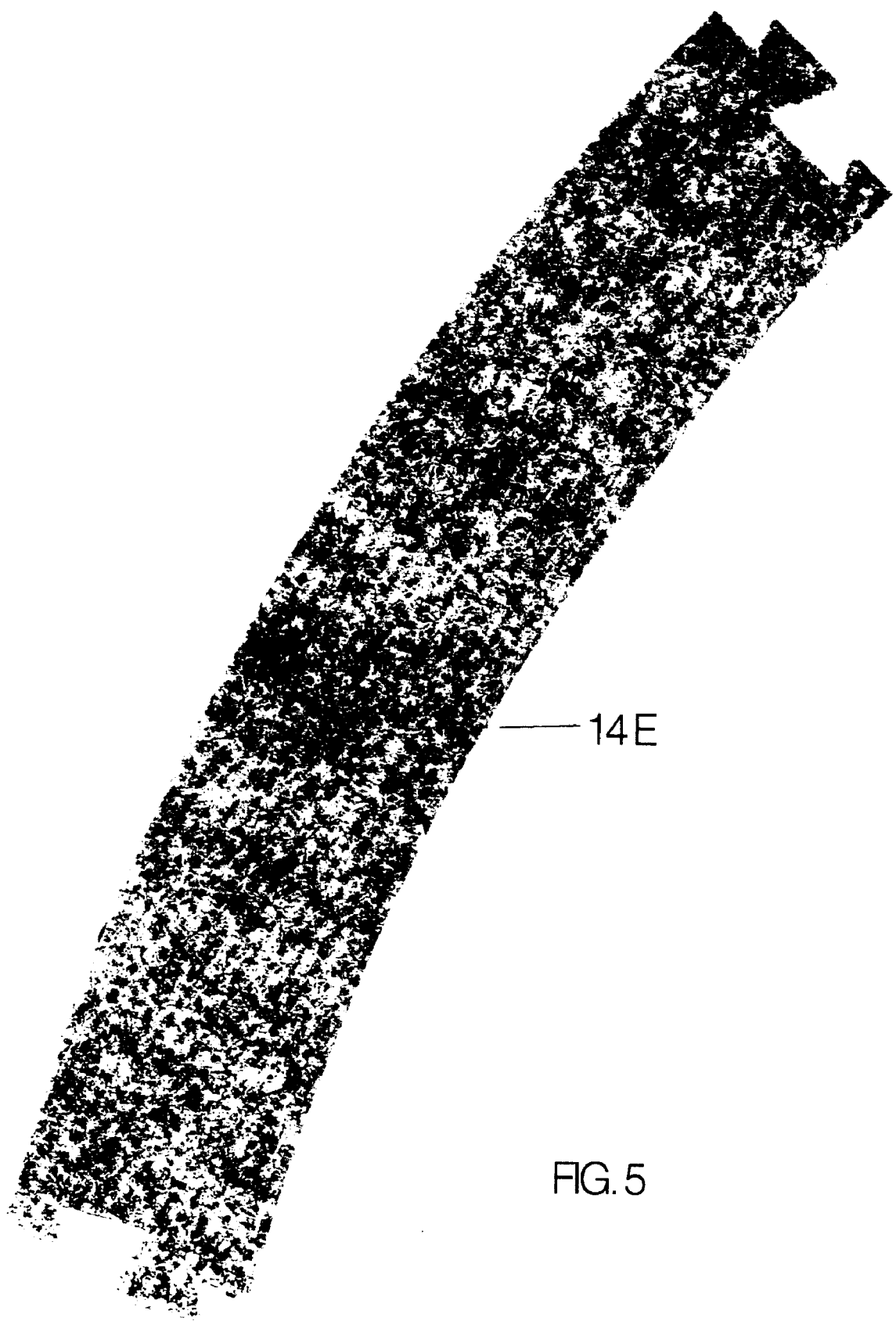
FIG. 5 is a plan view of the roadbed showing the texture and coloring of the roadbed to simulate ballast.

FIG. 5 shows the texture and coloring of the roadbed 14E which is designed to simulate the actual ballast of a full-size railroad roadbed.

The male and female locks of these sections are diecut because it is necessary to have a precise fit between the locks. A slightly different die is needed for a curved section depending upon the degree of curvature.

The sections of this track are easily put together on a flat surface because of the interlocking lock system with a male and female lock in a side-by-side arrangement on the end of each section. The sections are held in the proper position for placing the railroad tracks on top of the roadbed. Thus, each section of track is connected at each end by both a female and a male lock interlocked with a corresponding male and female lock on the abutting section of railroad roadbed.

While the invention has been disclosed in its preferred forms, it will be apparent to those skilled in the art that many modifications, additions, and deletions can be made therein without departing from the spirit and scope of the invention and its equivalents as set forth in the following claims.

Therefore, having thus described the invention, at least the following is claimed:

1. The locking system for the roadbed for a model railroad which is formed of the plurality of sections of roadbed, each section having two (2) ends, two (2) edges interconnecting the two (2) ends and an interior with a center line mid-way between the edges, said roadbed being made of a fibrous material, said locking system comprising:

two (2) locks in a side-by-side configuration on each end of each section with one of said locks being a male lock and the other a female lock, a. said male lock extending beyond the end of the section in which it is formed to a male base that is substantially parallel to said end of the section, said male lock having two (2) sides connected to said male base that converge towards each other in the direction towards said end of the section, with one side being nearer the center line of said section, said one side extending into the interior of said section, the other side being nearer an edge of said section and only extending to the end of said section, said other side being shorter than said one side nearer the center line, b. said female lock being of the same general configurations as the male lock, but being slightly larger than the male lock so as to be capable of receiving and holding a male lock on another section of the roadbed, said female lock being formed in said end of the section, said female lock having two (2) sides, with one (1) side being shared with the one (1) side of the male lock nearer the center and the other side of the female lock being nearer the edge of the section of the roadbed opposite the edge to which the other of the male lock is nearer, said sides of the female lock diverging away from each other towards a female base in the interior of the section, which is substantially parallel to said end of the section, said locks on different sections of the roadbed being capable of being interlocked so that a plurality of sections of the roadbed may be interlocked together to form the roadbed for a model railroad track.

2. The locking system of claim 1 in which the male lock on one end of the section of the roadbed is nearer one edge of the section and the male lock on the opposite end is nearer the opposite edge of the section.

3. The locking system of claim 2 in which the roadbed is constructed of indoor/outdoor carpet with an adhesive and which has a removable strip protecting the adhesive on the carpet which can be removed for attaching the roadbed to a flat surface.

4. A section of roadbed made of fibrous material for a model railroad which is formed of a plurality of sections of roadbed, each section comprising:

two (2) ends, two (2) edges interconnecting the two (2) ends and an interior with a center line mid-way between the edges, two (2) locks in a side-by-side configuration on each end of each section with one of said locks being a male lock and the other a female lock, a. said male lock extending beyond the end of said section in which it is formed to a male base that is substantially parallel to said end of said section, said male lock having two (2) sides connected to said male base that converge towards each other in the direction towards said end of said section, with one side being nearer the center line of said section, said one side extending into the interior of said section, the other side being nearer an edge of said section and only extending to the end of said section, said other side being shorter than said one side nearer the center line, b. said female lock being of the same general configuration as the male lock but being slightly larger than the male lock so as to be capable of receiving and holding a male lock on another section of the roadbed, said female lock being formed in said end of the section, said female lock having two (2) sides, with one side being shared with the one (1) side of the male lock nearer the center line and the other side of the female lock being nearer the edge of the section of the roadbed opposite the edge to which said other side of the male lock is nearer, said sides of the female lock diverging away from each other towards the female base in the interior of the section which is substantially parallel to said end of the section with the male lock on one end of said section being nearer one edge of the section, and the male lock on the opposite end being nearer the opposite edge of the section, said locks on different sections of the roadbed being capable of being interlocked so that a plurality of sections of the roadbed may be interlocked together to form the roadbed for a model railroad track.

5. The section of claim 4 in which the roadbed is constructed of indoor/outdoor carpet with an adhesive and which has a removable strip protecting the adhesive on the carpet which can be removed for attaching the roadbed to a flat surface.

6. A roadbed for a model railroad composed of plurality of sections of roadbed of claim 4 with some of the sections being straight sections and the others being curved.

* * * * *